United States Patent
Watanabe et al.

(10) Patent No.: US 11,120,298 B2
(45) Date of Patent: Sep. 14, 2021

(54) TENSOR IMAGE MAPPING DEVICE, METHOD, AND COMPUTER PROGRAM PRODUCT

(71) Applicant: Kabushiki Kaisha Toshiba, Tokyo (JP)

(72) Inventors: Tomoki Watanabe, Tokyo (JP); Satoshi Ito, Kawasaki Kanagawa (JP); Susumu Kubota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/257,687

(22) Filed: Sep. 6, 2016

(65) Prior Publication Data

US 2017/0091581 A1 Mar. 30, 2017

(30) Foreign Application Priority Data

Sep. 30, 2015 (JP) .............................. JP2015-193188

(51) Int. Cl.
*G06K 9/62* (2006.01)
*G06K 9/46* (2006.01)

(52) U.S. Cl.
CPC .......... *G06K 9/623* (2013.01); *G06K 9/4642* (2013.01); *G06K 9/6202* (2013.01); *G06K 9/624* (2013.01)

(58) Field of Classification Search
CPC ............. G06K 15/1881; G06K 9/4609; G06K 9/4647; G06K 9/6202; G06K 9/6215; G06K 9/623; G06K 9/4642; G06K 9/624
See application file for complete search history.

(56) References Cited

U.S. PATENT DOCUMENTS

| | | | | |
|---|---|---|---|---|
| 2010/0158376 | A1* | 6/2010 | Klosterman | G06K 9/4638 382/180 |
| 2011/0239032 | A1 | 9/2011 | Kato et al. | |
| 2014/0056519 | A1* | 2/2014 | Gupta | |
| 2014/0337262 | A1 | 11/2014 | Kato et al. | |
| 2016/0004942 | A1* | 1/2016 | Sumi | H04N 1/4051 358/3.06 |

(Continued)

FOREIGN PATENT DOCUMENTS

JP 5376920 B2 12/2013

OTHER PUBLICATIONS

Courbariaux et al., "BinaryConnect: Training Deep Neural Networks with binary weights during the propagations" (Year: 2016).*

(Continued)

*Primary Examiner* — Kenny A Cese
(74) *Attorney, Agent, or Firm* — Knobbe, Martens, Olson & Bear, LLP (57) ABSTRACT

According to an embodiment, a computing device includes a processing circuitry. The processing circuitry receives an input of tensor data. The processing circuitry sets a window in the tensor data. The processing circuitry compares, for each pair of coordinates in the tensor data within the window, a pixel value at the pair of coordinates with one or more thresholds, and selects a weight value corresponding to a comparison result. The processing circuitry adds the weight values selected for the respective pairs of coordinates to obtain a cumulative value. The processing circuitry derives a value based at least in part on the cumulative value.

17 Claims, 5 Drawing Sheets

(56) References Cited

U.S. PATENT DOCUMENTS

2017/0083788 A1* 3/2017 Chan .................... G06K 9/6201

OTHER PUBLICATIONS

Okatani, T., et al., "Deep Learning", Research Report Computer Vision and Image Media (CVIM), 2013-CVIM-185 (18), 1-17 (Jan. 16, 2013).

Courbariaux et al., "BinaryConnect: Training Deep Neural Networks with binary weights during propagations", NeurIPS, 2015 URL: htts://arxiv.0/4/abs/1511.00363v1. Published on Nov. 2, 2015.

Rastegari, et al., "XNOR-Net: ImageNet Classification Using Binary Convolutional Neural Networks", URL: https://aixiv.org/abs/1603.05279v1, Published on Mar. 16, 2016.

* cited by examiner

TENSOR IMAGE MAPPING DEVICE, METHOD, AND COMPUTER PROGRAM PRODUCT

CROSS-REFERENCE TO RELATED APPLICATION

This application is based upon and claims the benefit of priority from Japanese Patent Application No. 2015-193188, filed on Sep. 30, 2015; the entire contents of which are incorporated herein by reference.

FIELD

Embodiments described herein relate generally to a computing device, a computing method, and a computer program product.

BACKGROUND

In recent years, a mathematical model called a neural network has been applied to pattern recognition such as image recognition and voice recognition. The neural network includes a plurality of processing layers. When a pattern as a recognition target is input, the neural network performs a repetitive calculation with the processing layers, and outputs a pattern recognition result such as detection, identification, and labeling.

As the processing layer constituting the neural network, a processing layer called a convolution layer or a fully connected layer is mainly used. Calculation performed in the convolution layer is represented, for example, by Equation (1):

$$y(o_x, o_y) = f\left(b + \sum_{j=0}^{O_h-1} \sum_{i=0}^{O_w-1} w(i, j) x(O_x + i, O_y + j)\right) \quad (1)$$

In this case, x represents tensor data input to the convolution layer, $(O_x, O_y)$ represents coordinates in the tensor data at which an origin of a filter window set in the tensor data is positioned, $O_w$ represents a width of the filter window, $O_h$ represents a height of the filter window, and $x(O_x+i, O_y+j)$ represents a value of a position $(O_x+i, O_y+j)$ of the tensor data in the filter window. Here, $w(i, j)$ represents a weight value at a position $(i, j)$ in the filter window; b represents a bias; $f()$ represents a non-linear function, which is typically a sigmoid function, a tank function, and the like; and $y(O_x, O_y)$ represents an output value of the tensor data output from the convolution layer. Herein, the tensor data is represented as a multidimensional array.

When a range of the tensor data is identical to a range of the set filter window, that is, when all elements in the tensor data are contained in the filter window, Equation (1) represents calculation performed in the fully connected layer.

In the related art as described above, multiplication between the weight value and the value at the position of the tensor data is caused in the calculation performed in the convolution layer or the fully connected layer, so that an amount of calculation is increased.

DETAILED DESCRIPTION

According to an embodiment, a computing device includes a processing circuitry. The processing circuitry receives an input of tensor data. The processing circuitry sets a window in the tensor data. The processing circuitry compares, for each pair of coordinates in the tensor data within the window, a pixel value at the pair of coordinates with one or more thresholds, and selects a weight value corresponding to a comparison result. The processing circuitry adds the weight values selected for the respective pairs of coordinates to obtain a cumulative value. The processing circuitry derives a value based at least in part on the cumulative value.

The following describes an embodiment in detail with reference to the attached drawings.

Figure 1:
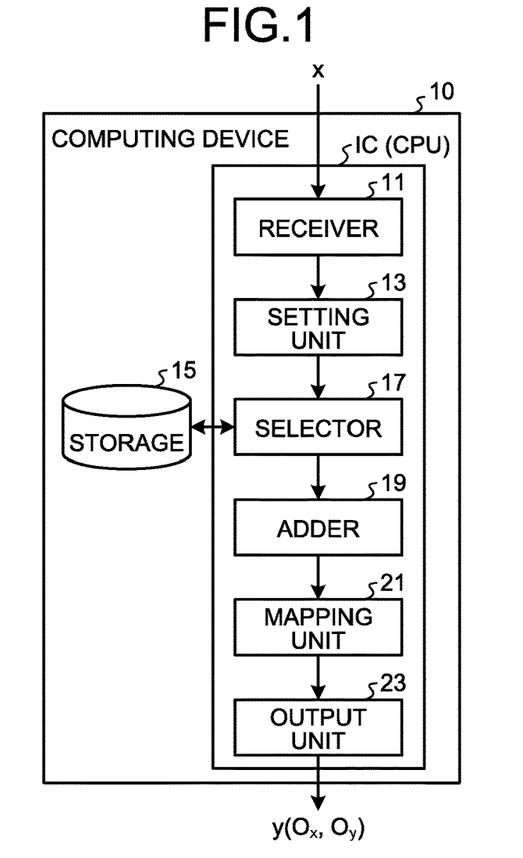
FIG. 1 is a configuration diagram illustrating an example of a computing device according to an embodiment.

FIG. 1 is a configuration diagram illustrating an example of a computing device 10 according to the embodiment. As illustrated in FIG. 1, the computing device 10 includes a receiver 11, a setting unit 13, a storage 15, a selector 17, an adder 19, a mapping unit 21, and an output unit 23.

The receiver 11, the setting unit 13, the selector 17, the adder 19, the mapping unit 21, and the output unit 23 may be, for example, implemented as hardware such as an integrated circuit (IC), may be implemented by causing a processing device such as a central processing unit (CPU) to execute a computer program, that is, implemented as software, or may be implemented using both of software and hardware.

For example, the storage 15 can be implemented by a storage device that can magnetically, optically, or electrically store data such as a memory, a hard disk drive (HDD), a solid state drive (SSD), an optical disc, a read only memory (ROM), and a random access memory (RAM).

The computing device 10 according to the embodiment performs calculation in a convolution layer or a fully connected layer constituting a neural network, and obtains an approximate value of a calculation result represented by Equation (1) through the calculation represented by Equation (2):

$$y(O_x, O_y) = f\left(b + \sum_{j=0}^{O_h-1} \sum_{i=0}^{O_w-1} \text{select}(i, j, x(O_x + i, O_y + j))\right) \quad (2)$$

In this case, x represents tensor data input to the computing device 10, $(O_x, O_y)$ represents coordinates in the tensor data at which an origin of a filter window set in the tensor data is positioned, $O_w$ represents a width of the filter window, $O_h$ represents a height of the filter window, and $x(O_x+i, O_y+j)$ represents a pixel value of a position $(O_x+i, O_y+j)$ of the tensor data in the filter window. The tensor data is represented as a multidimensional array as described above.

A function of select $(i, j, x(O_x+i, O_y+j))$ is a function for selecting a weight value at a position $(i, j)$ in the filter window. For example, a function for selecting the weight value from among two weight values represented by Equation (3) and a function for selecting the weight value from among three weight values represented by Equation (4) can be utilized as the above function. However, the embodiment is not limited thereto. For example, select( ) may be a function for selecting the weight value from among four or more weight values.

$$\text{select}(i, j, a) = \begin{cases} w(i, j) & a > T \\ 0 & \text{otherwise} \end{cases} \quad (3)$$

$$\text{select}(i, j, a) = \begin{cases} w(i, j, +1) & T < a \\ 0 & -T \le a \le T \\ w(i, j, -1) & a < -T \end{cases} \quad (4)$$

A function represented by Equation (3) is a function for selecting the weight value $w(i, j)$ when a value of a variable a (corresponding to a value of $x(O_x+i, O_y+j)$ in Equation (2)) is larger than a threshold T, and selecting the weight value 0 when the value of the variable a is equal to or smaller than the threshold T.

A function represented by Equation (4) is a function for selecting the weight value $w(i, j, +1)$ when the value of the variable a is larger than the threshold T, selecting the weight value 0 when the value of the variable a is equal to or larger than the threshold $-T$ and equal to or smaller than the threshold T, and selecting the weight value $w(i, j, -1)$ when the value of the variable a is smaller than the threshold $-T$.

Returning to the description of Equation (2), b represents a bias; f( ) represents a non-linear function, which is typically a sigmoid function, a tank function, and the like; and $y(O_x, O_y)$ represents an output value of the tensor data output from the computing device 10.

When a range of the tensor data is identical to a range of the set filter window, Equation (2) represents calculation performed in the fully connected layer.

For simplifying the expression, Equations (2) to (4) represent a case in which the tensor data that is input or output and the selected weight value are in a two-dimensional array. Also in the following description, the two-dimensional array is assumed unless specifically mentioned. However, the embodiment is not limited to the case of the two-dimensional array. The embodiment can be easily expanded to a case in which the tensor data that is input or output and the selected weight value are in a one-dimensional array or a three- or more dimensional array, and generality of the embodiment is not lost in such a case, so that the embodiment naturally encompasses such a case.

The following describes the receiver 11, the setting unit 13, the storage 15, the selector 17, the adder 19, the mapping unit 21, and the output unit 23 with reference to Equations (2) to (4).

The receiver 11 receives an input of the tensor data. The tensor data received by the receiver 11 corresponds to x in Equation (2).

For example, when calculation performed by the computing device 10 in the convolution layer or the fully connected layer corresponds to the calculation in the first layer of the processing layers constituting the neural network, the receiver 11 receives an input of image data as the tensor data. For example, when the image data is an RGB color image, the tensor data is three-dimensional array data having a size of (3×a width of the image×a height of the image).

For example, when the calculation performed by the computing device 10 in the convolution layer or the fully connected layer corresponds to the calculation in the n-th (n is a natural number equal to or larger than 2) layer of the processing layers constituting the neural network, the receiver 11 receives an input of a feature map output from the (n−1)-th processing layer as the tensor data. For example, when the (n−1)-th processing layer is the feature map of the convolution layer, the tensor data is three-dimensional array data having a size of (the number of feature maps×a width of the feature map×a height of the feature map). For example, when the (n−1)-th processing layer is the feature map of the fully connected layer, the tensor data is one-dimensional array data having a length equal to the number of feature maps.

Figure 2:
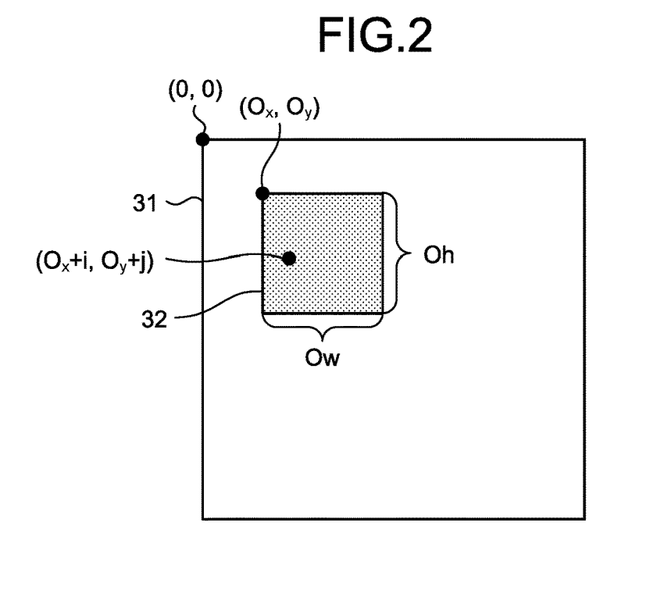
FIG. 2 is a diagram illustrating an example of tensor data to which a filter window according to the embodiment is set.

The setting unit 13 sets a window (filter window) to the tensor data received by the receiver 11. FIG. 2 is a diagram illustrating an example of tensor data 31 to which a filter window 32 according to the embodiment is set. As illustrated in FIG. 2, $(O_x, O_y)$ represents coordinates in the tensor data at which an origin of the filter window 32 set in the tensor data 31 is positioned, $O_w$ represents a width of the filter window 32, $O_h$ represents a height of the filter window 32, and $(O_x+i, O_y+j)$ represents a position of the tensor data 31 in the filter window 32. In the example illustrated in FIG. 2, the origin of the filter window 32 is positioned at the upper left. However, the embodiment is not limited thereto. In a case of the fully connected layer, the setting unit 13 sets a window as the entire range of the tensor data received by the receiver 11.

The storage 15 associates two or more weight values with each pair of coordinates in the window set by the setting unit 13 to be stored. For example, when the function represented by Equation (3) is used, the storage 15 associates the weight value $w(i, j)$ and the weight value 0 with each pair of coordinates $(i, j)$ in the filter window to be stored. For example, when the function represented by Equation (4) is used, the storage 15 associates the weight value $w(i, j, +1)$, the weight value 0, and the weight value $w(i, j, -1)$ with each pair of coordinates $(i, j)$ in the filter window to be stored.

The storage 15 stores a filter weight as a set of weight values in the filter window in (the number of dimensions of the filter window+1)-dimensional array. For example, when the number of dimensions of the filter window is 2 and the function represented by Equation (4) is used, the number of selectable weights is 3, and one of them is always 0. Thus, the storage 15 stores the filter weight in a three-dimensional array having a size of (a width of the filter×a height of the filter×2). Similarly, when the function represented by Equation (3) is used, the number of selectable weights is 2, and one of them is always 0. Thus, the storage 15 stores the filter weight in a three-dimensional array (in this case, substantially a two-dimensional array) having a size of (a width of the filter×a height of the filter×1).

As the filter weight to be stored by the storage 15, for example, a filter weight calculated (learned) in advance using a method such as machine learning can be used. For example, as the filter weight to be stored by the storage 15, a weight value of a convolution filter can be used, the weight value being obtained by learning the neural network including the convolution layer of Equation (1) using a typical method for a neural network such as a stochastic gradient descent (SGD) method. For example, as the filter weight to be stored by the storage 15, a weight value of the convolution filter may be used, the weight value being obtained by directly optimizing the neural network including the convolution layer of Equation (2). However, a method of calculating the filter weight is not limited thereto.

Two or more weight values associated with the coordinates in the filter window preferably include 0. That is, any one of the two or more weight values associated with the coordinates in the filter window is preferably 0. This is because additional processing performed by the adder 19 (described later) can be omitted when the weight value is 0. For example, when the function represented by Equation (3) is used for selecting the weight value, by adjusting the weight value w(i, j) using the bias b in Equation (2), any one of the weight values can be set to 0 without changing a value of $Y(O_x, O_y)$ as an output value of the computing device 10.

The selector 17 compares the pixel value at the coordinates with one or more thresholds for each pair of coordinates in the tensor data in the window set by the setting unit 13, and selects the weight value corresponding to a comparison result. Specifically, the selector 17 selects the weight value corresponding to the comparison result from among two or more weight values that are associated with the coordinates in the window opposed to the coordinates in the tensor data by the storage 15 for each pair of coordinates in the tensor data in the window set by the setting unit 13. The selector 17 selects the weight value using the function represented by Equation (3) or (4), for example. That is, the selector 17 compares the pixel value at the coordinates in the tensor data with one or more thresholds in magnitude, and selects the weight value corresponding to the comparison result.

For example, to select the weight value at the coordinates $(O_x, O_y)$ in the tensor data using Equation (3), the selector 17 compares the pixel value $x(O_x, O_y)$ with the threshold T. When the pixel value $x(O_x, O_y)$ is larger than the threshold T, the selector 17 selects the weight value w(0, 0). When the pixel value $x(O_x, O_y)$ is equal to or smaller than the threshold T, the selector 17 selects the weight value 0. The coordinates in the window opposed to the coordinates in the tensor data can be obtained by subtracting $O_x$ from the X-coordinate and subtracting $O_y$ from the Y-coordinate in the tensor data. Accordingly, the coordinates in the window opposed to the coordinates $(O_x, O_y)$ in the tensor data are (0, 0).

The adder 19 cumulatively adds the weight values selected by the selector 17 for the respective pairs of coordinates in the tensor data within the window set by the setting unit 13, and obtains a cumulative added value. The processing performed by the adder 19 corresponds to processing of the right side in f( ) of Equation (2) (processing represented by a sum total sign Σ).

As described above, when the weight values include 0 and the weight value 0 is selected by the selector 17, a value of select (i, j, $x(O_x+i, O_y+j)$) is also 0, so that addition processing may be omitted. That is, the adder 19 may cumulatively add the weight values other than 0 among the weight values selected by the selector 17 for the respective pairs of coordinates in the tensor data within the window set by the setting unit 13.

The adder 19 sets the left side (bias b) in f( ) of Equation (2) to be an initial value of a variable to be cumulatively added, or separately adds the left side (bias b) to a result of cumulative addition.

The mapping unit 21 maps the cumulative added value added by the adder 19. The processing performed by the mapping unit 21 corresponds to processing of f( ) in Equation (2).

The output unit 23 outputs a value based on the cumulative added value added by the adder 19. Specifically, the output unit 23 outputs a mapped value of the cumulative added value mapped by the mapping unit 21.

Figure 3:
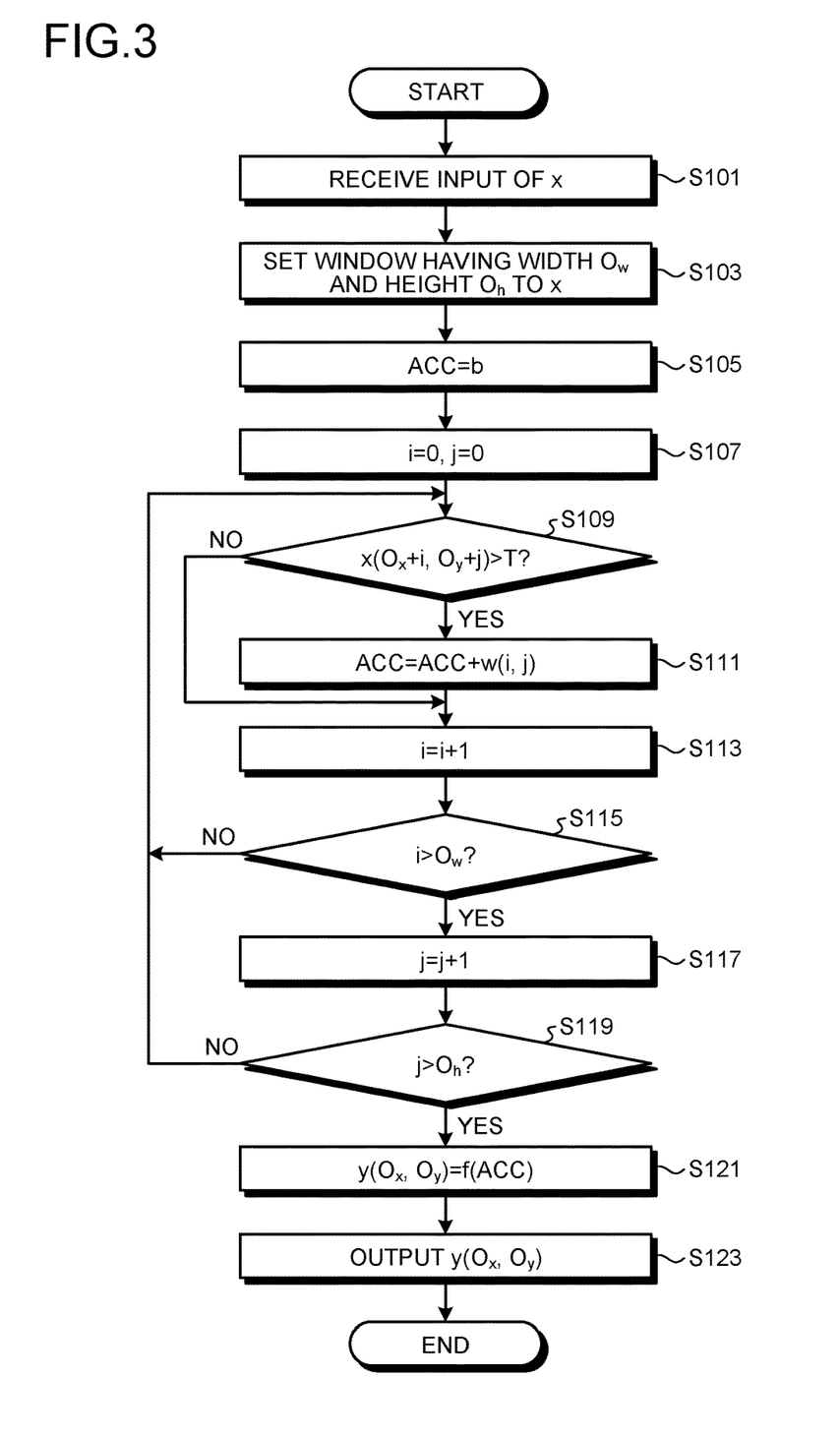
FIG. 3 is a flowchart illustrating a processing example of the embodiment.

FIG. 3 is a flowchart illustrating an example of a processing procedure according to the embodiment. FIG. 3 exemplifies a case in which the function represented by Equation (3) is used as the function for selecting the weight value. However, the embodiment is not limited thereto.

First, the receiver 11 receives an input of tensor data x (Step S101).

The setting unit 13 then sets a filter window having a width $O_w$ and a height $O_h$ in the tensor data x received by the receiver 11 (Step S103).

The adder 19 then sets a value of the bias b to an initial value of a cumulative added value ACC (Step S105).

The adder 19 then initializes values of a variable i and a variable j to be 0 (Step S107).

The selector 17 then determines whether a pixel value $x(O_x+i, O_y+j)$ at coordinates $(O_x+i, O_y+j)$ in the tensor data x is larger than the threshold T (Step S109).

If the pixel value $x(O_x+i, O_y+j)$ is larger than the threshold T (Yes at Step S109), the selector 17 selects the weight value w(i, j), and the adder 19 adds the selected weight value w(i, j) to the cumulative added value ACC (Step S111).

If the pixel value $x(O_x+i, O_y+j)$ is equal to or smaller than the threshold T (No at Step S109), the selector 17 selects the weight value 0, so that the processing at Step S111 is not performed.

The adder 19 then increments the value of the variable i (Step S113). If the value of the variable i is equal to or smaller than the width $O_w$ (No at Step S115), the process returns to Step S109. If the value of the variable i is larger than the width $O_w$ (Yes at Step S115), the process proceeds to Step S117.

The adder 19 then increments the value of the variable j (Step S117). If the value of the variable j is equal to or smaller than the height Oh (No at Step S119), the process returns to Step S109. If the value of the variable j is larger than the height $O_h$ (Yes at Step S119), the process proceeds to Step S121.

The mapping unit 21 then maps the cumulative added value ACC added by the adder 19 with the non-linear function f( ), and obtains the output value $y(O_x, O_y)$ (Step S121).

The output unit 23 then outputs the output value $y(O_x, O_y)$ obtained by the mapping unit 21 (Step S123).

As described above, according to the embodiment, calculations performed in the convolution layer or the fully connected layer constituting the neural network can be approximated through selection and addition without multiplication, so that an amount of the calculations performed in the convolution layer or the fully connected layer can be reduced. This is because an operation scale of selection or addition is smaller than that of multiplication. This configuration can also reduce costs of the computing device that performs the calculations in the convolution layer or the fully connected layer.

According to the embodiment, any one of the two or more weight values associated with the pair of coordinates in the filter window is 0. Thus, if the weight value is 0, the value of select (i, j, $x(O_x+i, O_y+j)$) is also 0, so that addition processing can be omitted. This configuration can further reduce the amount of the calculations performed in the convolution layer or the fully connected layer, and can further reduce the costs of the computing device that performs the calculations in the convolution layer or the fully connected layer.

First Modification

In the above embodiment, the pixel value of the tensor data is assumed to be a continuous value. In a first modification, the pixel value of the tensor data is assumed to be a discrete value. The following mainly describes differences from the above embodiment, a component having the same function as that in the above embodiment is denoted by the same name and the same reference numeral as those in the above embodiment, and description thereof will not be repeated.

The calculation in the convolution layer or the fully connected layer performed by the computing device 10 according to the first modification corresponds to calculation in the n-th (n is a natural number equal to or larger than 2) processing layer constituting the neural network. Thus, the receiver 11 receives an input of the feature map output from the (n−1)-th processing layer as the tensor data.

The first modification describes a case in which the pixel value of the tensor data (feature map) is binary {+1, −1} and a case in which the pixel value is ternary {+1, 0, −1}. However, the modification is not limited thereto. The values in binary or ternary format are not limited thereto. For example, the values in binary format may be {0, 1}. The embodiment can be easily expanded to a case in which the pixel value of the tensor data is quaternary or more, and generality of the embodiment is not lost in such a case, so that the embodiment naturally encompasses such a case.

In the first modification, the selector 17 compares the pixel value at the pair of coordinates in the tensor data with one or more thresholds to determine whether the pixel value is identical to the threshold, and selects the weight value corresponding to a comparison result. The selector 17 can utilize, as select( ), for example, a function for selecting the weight value from among the two weight values represented by Equation (5) or a function for selecting the weight value from among the three weight values represented by Equation (6). However, the embodiment is not limited thereto. For example, select( ) may be a function for selecting the weight value from among four or more weight values.

$$\text{select}(i, j, a) = \begin{cases} w(i, j) & a = +1 \\ 0 & a = -1 \end{cases} \quad (5)$$

$$\text{select}(i, j, a) = \begin{cases} w(i, j, +1) & a = +1 \\ 0 & a = 0 \\ w(i, j, -1) & a = -1 \end{cases} \quad (6)$$

According to the function represented by Equation (5), the weight value w(i, j) is selected when the value of the variable a is +1, and the weight value 0 is selected when the value of the variable a is −1.

According to the function represented by Equation (6), the weight value w(i, j, +1) is selected when the value of the variable a is +1, the weight value 0 is selected when the value of the variable a is 0, and the weight value w(i, j, −1) is selected when the value of the variable a is −1.

Instead of determining whether the values are identical to each other, the selector 17 may select the weight value using a look-up table method of referring to a value indicated by an address obtained by adding, as a relative address, the pixel value to a head address in a storage region of the storage 15 in which the weight value is stored.

In the first modification, the mapping unit 21 maps the cumulative added value added by the adder 19 into a discrete value. Specifically, the mapping unit 21 converts (maps) the cumulative added value added by the adder 19 into a discrete value using a non-linear function. In this case, the mapping unit 21 can utilize a function for selecting an output value from among binary values represented by Equation (7) or a function for selecting an output value from among ternary values represented by Equation (8) in place of f( ) of Equation (2). However, the embodiment is not limited thereto. For example, a function for selecting an output value from among quaternary values may be used in place of f( ).

$$\text{step}(a) = \begin{cases} +1 & a > 0 \\ -1 & \text{otherwise} \end{cases} \quad (7)$$

$$\text{step3}(i, j, a) = \begin{cases} +1 & T < a \\ 0 & -T \le a \le T \\ -1 & a < -T \end{cases} \quad (8)$$

The function represented by Equation (7) is a function for converting the output value into 1 when the value of the variable a (corresponding to the cumulative added value) is larger than 0, and converting the output value into −1 when the value of the variable a is equal to or smaller than 0.

The function represented by Equation (8) is a function for converting the output value into 1 when the value of the variable a is larger than the threshold T, converting the output value into 0 when the value of the variable a is equal to or larger than the threshold −T and equal to or smaller than the threshold T, and converting the output value into −1 when the value of the variable a is smaller than the threshold −T.

As described above, according to the embodiment, the pixel value of the input tensor data (feature map) is a discrete value, so that a memory capacity for temporarily storing the tensor data can be suppressed, and the costs of the computing device that performs calculation in the convolution layer or the fully connected layer can be reduced. For example, when the pixel value of the tensor data is represented in binary format, the pixel value can be stored with one bit, so that the memory capacity can be reduced.

Second Modification

A second modification describes an example of performing, in a case in which the tensor data (feature map) output from the computing device is a three-dimensional array including a plurality of maps, calculation on values of the maps in parallel. The following mainly describes differences from the above embodiment, a component having the same function as that in the above embodiment is denoted by the same name and the same reference numeral as those in the above embodiment, and description thereof will not be repeated.

In the second modification, assuming that the number of maps on which calculation is performed in parallel is L, each of the bias b and the output value y($O_x$, $O_y$) in Equation (2) is a vector having a length L. In the second modification, the storage 15 stores weight values corresponding to L filter weights, and copes with L map outputs. The selector 17 selects the weight values corresponding to L filter weights. In the second modification, w is a vector having the length L in Equations (3), (4), (5), and (6). In the second modification, the cumulative added value is a vector having the length L.

According to the second modification, calculation can be performed on pixel values of a plurality of outputs in parallel for a pixel value of one input, so that the number of times of calculation for comparison can be reduced. This configuration can further suppress the amount of the calculations performed in the convolution layer or the fully connected layer, and can further reduce the costs of the computing device that performs the calculations in the convolution layer or the fully connected layer.

Application Example

The following describes an application example of the computing device 10 described in the above embodiment, the first modification, and the second modification. As described above, the computing device 10 described in the above embodiment, the first modification, and the second modification can reduce the amount of the calculations performed in the convolution layer or the fully connected layer constituting the neural network.

Accordingly, when the computing device 10 is implemented as hardware (a circuit), a multiplier is not necessarily provided and the memory capacity can be suppressed as described above, so that a circuit scale can be reduced. Especially in the computing device 10, the multiplier is not required to be parallelized even when processing is parallelized, so that the processing can be accelerated and the circuit scale can be reduced at the same time.

Accordingly, when large-scale integration (LSI) is implemented for performing calculation for a neural network using the computing device 10, the LSI for performing calculation for a neural network the circuit scale of which is reduced as compared with that in the related art can be implemented, which is preferable to built-in equipment such as onboard equipment and household electrical appliances. This is because reduction in the circuit scale is advantageous against various constraints on a capacity of a battery, a sales price, a heating value, and the like of the built-in equipment.

The following describes an application example in which the LSI to which the computing device 10 is applied is mounted on a vehicle, and pedestrian detection is performed as pattern recognition using the LSI. However, the application example is not limited thereto.

Figure 4:
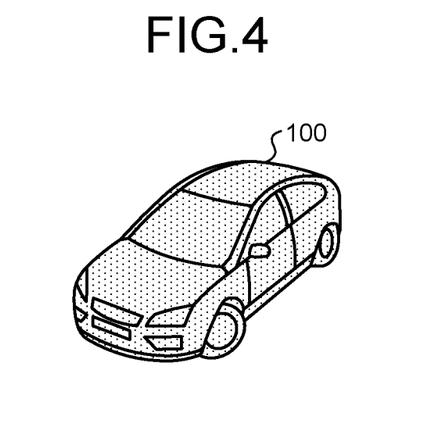
FIG. 4 is a schematic diagram illustrating an example of a vehicle according to an application example.
Figure 5:
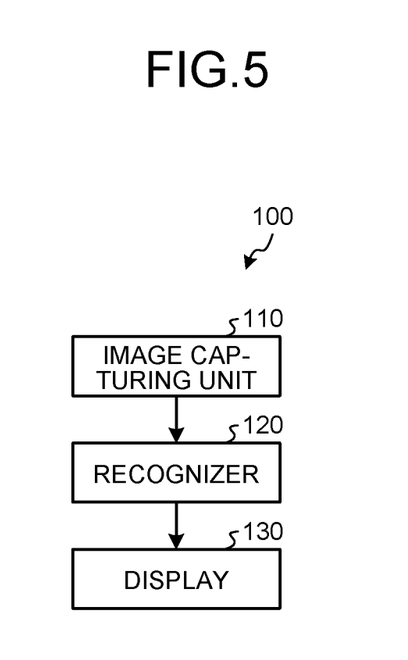
FIG. 5 is a diagram illustrating a configuration example of the vehicle according to the application example.

FIG. 4 is a schematic diagram illustrating an example of a vehicle 100 according to the application example, and FIG. 5 is a diagram illustrating a configuration example of the vehicle 100 according to the application example. As illustrated in FIG. 5, the vehicle 100 includes an image capturing unit 110, a recognizer 120, and a display 130.

The image capturing unit 110 can be implemented with an image sensor such as a camera, for example. The recognizer 120 can be implemented with the LSI.

Figure 6:
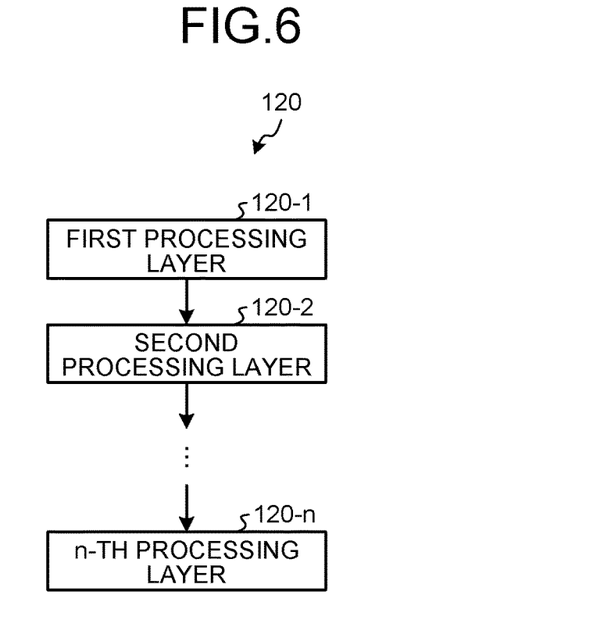
FIG. 6 is a diagram illustrating an example of a specific configuration of a recognizer according to the application example.

The recognizer 120 is the LSI that performs calculation for a neural network. FIG. 6 is a diagram illustrating an example of a specific configuration of the recognizer 120 according to the application example. As illustrated in FIG. 6, the recognizer 120 includes a first processing layer 120-1 to an n-th processing layer 120-n. Among the first processing layer 120-1 to the n-th processing layer 120-n, the configuration described for the computing device 10 is employed for a processing layer corresponding to the convolution layer or the fully connected layer.

Figure 7:
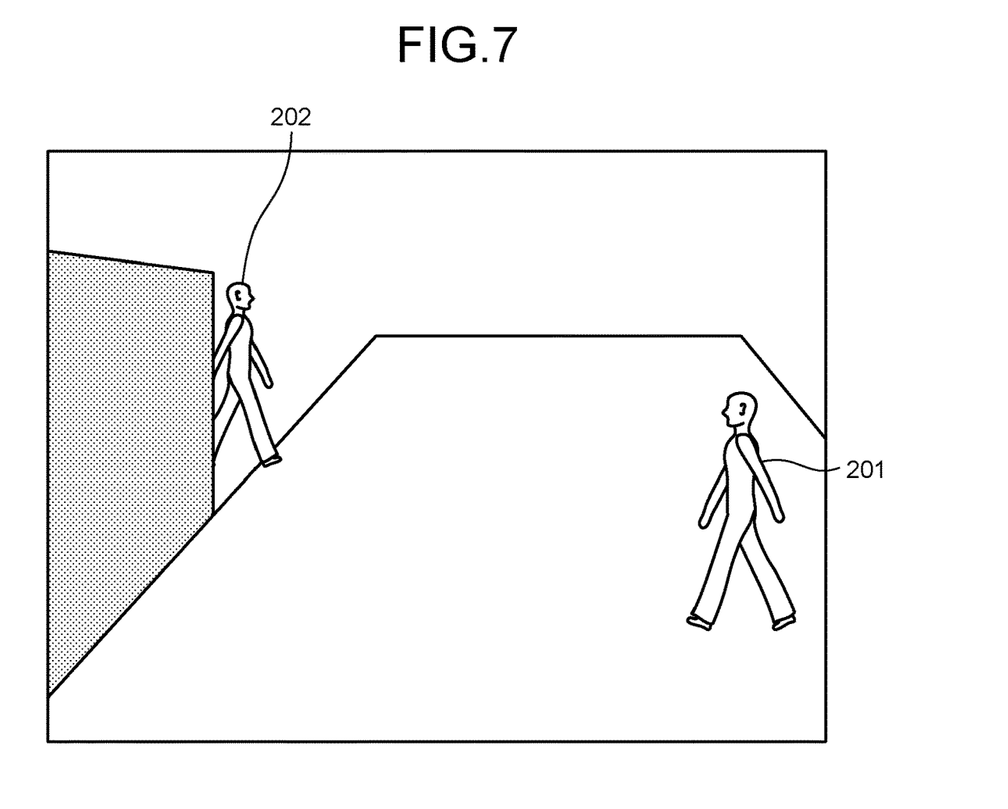
FIG. 7 is a diagram illustrating an example of an input image according to the application example.

An image captured by the image capturing unit 110 is input to the recognizer 120. For example, as illustrated in FIG. 7, the image in which pedestrians 201 and 202 are reflected is input.

Figure 8:
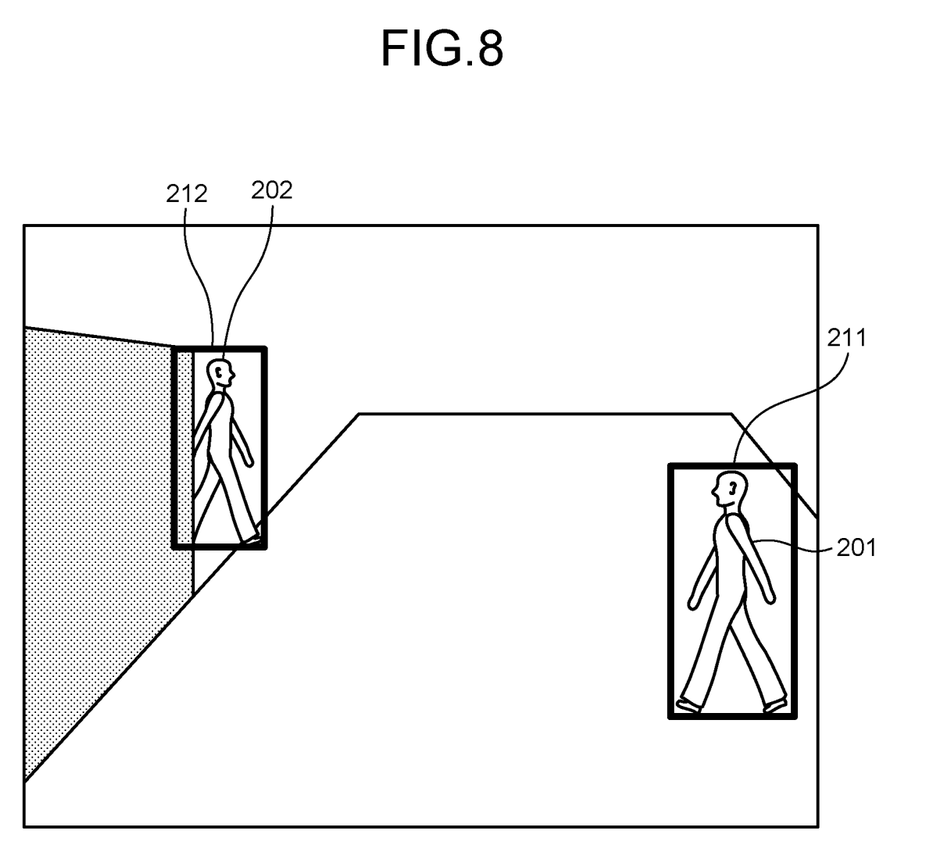
FIG. 8 is a diagram illustrating an example of an output image according to the application example.

When the image (tensor data) is input to the recognizer 120 from the image capturing unit 110, first, the first processing layer 120-1 performs calculation for pedestrian detection using the input image, and outputs the feature map to the second processing layer 120-2. Next, the second processing layer 120-2 performs calculation for pedestrian detection using the feature map output from the first processing layer 120-1, and outputs the feature map to the third processing layer 120-3. Finally, the n-th processing layer 120-n outputs an image representing a detection result of pedestrians to be displayed on the display 130. For example, as illustrated in FIG. 8, an image in which frames 211 and 212 are given to the pedestrians 201 and 202, respectively, is output.

As described above, according to the application example, the LSI preferable to the built-in equipment that performs calculation for a neural network can be implemented.

Alternatively, the computing device 10 may be implemented as software instead of hardware (a circuit) to implement a calculation (arithmetic) function for a neural network. In this case, a calculation (arithmetic) function for a neural network to which the computing device 10 is applied as software is preferable, for example, to a server that processes a large amount of data at the same time through an Internet service or the like, which can implement a system the costs of which are suppressed by reducing a use time of a CPU and memory usage.

Program Configuration

The computer program executed by the computing device 10 according to the above embodiment and modifications and executed in the application example is stored and provided in a computer-readable storage medium, which may be provided as a computer program product, such as a compact disc read only memory (CD-ROM), a compact disc recordable (CD-R), a memory card, a digital versatile disc (DVD), and a flexible disk (FD), as an installable or executable file.

The computer program executed by the computing device 10 according to the above embodiment and modifications and executed in the application example may be stored in a computer connected to a network such as the Internet and provided by being downloaded via the network. Furthermore, the computer program executed by the computing device 10 according to the above embodiment and modifications and executed in the application example may be provided or distributed via a network such as the Internet. The computer program executed by the computing device 10 according to the above embodiment and modifications and executed in the application example may be embedded and provided in a ROM, for example.

The computer program executed by the computing device 10 according to the above embodiment and modifications and executed in the application example has a module configuration for causing the components described above to be implemented on a computer. As actual hardware, when a CPU reads the computer program from a ROM, an HDD, and the like onto a RAM to be executed, the components are implemented on the computer.

The embodiment and modifications are not limited to the above description. In an implementation phase, the components can be modified and embodied without departing from the gist of the embodiment. Various inventions can be made by appropriately combining a plurality of components disclosed in the above embodiment and modifications. For example, some components may be removed from all the components disclosed in the above embodiment and modifications. Furthermore, components of a different embodiment and modifications may be appropriately combined.

For example, the steps in the flowchart according to the embodiment may be performed by changing performing order, a plurality of steps may be performed at the same time, or the steps may be performed in different order for each implementation unless contrary to the nature thereof.

As described above, according to the embodiment, the modifications, and the application example, the amount of the calculations performed in the convolution layer or the fully connected layer can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computing device that receives a first image data in tensor form in which an object is reflected, and outputs a second image data representing a detection result of the object, the device comprising:
   a storage; and
   processing circuitry configured to function as a receiver, a setting unit, a selector, an adder, a mapping unit, and an output unit, wherein
   the receiver receives an input of tensor data based on the first image data in tensor form;
   the setting unit sets a window in the tensor data;
   the selector compares, for each pair of coordinates in the tensor data within the window, a pixel value at the pair of coordinates with one or more thresholds, and selects one or more weight values from a plurality of weight values according to a comparison result of whether the pixel value is larger than the one or more thresholds, wherein at least one value of the plurality of weight values is 0;
   the adder sets an initial value, wherein a non-zero value of the plurality of weight values is adjusted based at least in part on the initial value such that at least one of the selected one or more weight values is set to 0;
   the adder adds the initial value and non-zero values of the selected one or more weight values selected for the respective pairs of coordinates to obtain a cumulative value;
   the mapping unit derives a mapped value based on a non-linear function of the cumulative value; and
   the output unit outputs the mapped value to derive the second image data.

2. The device according to claim 1, wherein the storage stores the plurality of weight values in association with each pair of coordinates within the window.

3. The device according to claim 1, wherein the selector selects, for each pair of coordinates in the tensor data within the window, the selected one or more weight values corresponding to the comparison result from among the plurality of weight values associated with a pair of coordinates within the window opposed to the each pair of coordinates in the tensor data.

4. The device according to claim 3, wherein the adder adds the weight values other than the 0 value among the selected one or more weight values selected for the respective pairs of coordinates.

5. The device according to claim 1, wherein the selector compares the pixel value at the pair of coordinates in the tensor data with one or more magnitude thresholds.

6. The device according to claim 1, wherein the processing circuitry is configured to map the cumulative value, and the mapping unit derives a mapped value of the cumulative value.

7. The device according to claim 1, wherein
   the pixel value of the tensor data is a discrete value, and
   the selector determines whether the pixel value is identical to a threshold from the one or more thresholds when comparing the pixel value at the coordinates in the tensor data with the one or more thresholds.

8. The device according to claim 7, wherein the discrete value is a binary.

9. The device according to claim 7, wherein the processing circuitry is configured to map the cumulative added value into a discrete value, and the mapping unit derives a mapped value of the cumulative value.

10. The device according to claim 1, wherein each of the plurality of weight values and the cumulative added value is a vector.

11. The device according to claim 1, wherein the selector sets the window as the entire range of the tensor data.

12. The device according to claim 1, wherein the storage is configured to store therein two or more weight values associated with each of the pair of coordinates in the window set by the setting unit, and the selector selects the one or more weight values from among the two or more weight values stored in the storage.

13. The device according to claim 12, wherein one of the two or more weight values associated with each of the pair of coordinates in the window is 0.

14. The device according to claim 1, wherein the computing device performs calculation in a convolution layer or a fully connected layer in a neural network.

15. A device comprising:
   a plurality of computing devices including the computing device according to claim 1, the first image data being input to a first computing device of the plurality of computing device; and
   a display configured to display the second image based on a mapped value output from a second computing device of the plurality of computing device.

16. A computing method comprising:
   receiving an input of tensor data based on a first image data in tensor form in which an object is reflected;
   setting a window in the tensor data;
   comparing, for each pair of coordinates in the tensor data within the window, a pixel value at the pair of coordinates with one or more thresholds;
   selecting one or more weight values from a plurality of weight values according to a comparison result of whether the pixel value is larger than the one or more thresholds, wherein at least one value of the plurality of weight values is 0;
   setting an initial value;
   adjust a non-zero value of the plurality of weight values based at least in part on the initial value such that at least one of the selected one or more weight values is set to 0;

adding the initial value and non-zero values of the selected one or more weight values selected for the respective pairs of coordinates to obtain a cumulative value;

deriving a mapping value based on a non-linear function of the cumulative value; and outputting the mapped value to derive a second image data, the second image data representing a detection result of the object.

17. A computer program product that receives a first image data in tensor form in which an object is reflected, and outputs a second image data representing a detection result of the object, the computer program product comprising a non-transitory computer-readable medium storing a program executed by a computer, the program causing the computer to execute:

receiving an input of tensor data based on the first image data in tensor form;

setting a window in the tensor data;

comparing, for each pair of coordinates in the tensor data within the window, a pixel value at the pair of coordinates with one or more thresholds;

selecting one or more weight values from a plurality of weight values according to a comparison result of whether the pixel value is larger than the one or more thresholds, wherein at least one value of the plurality of weight values is 0, setting an initial value;

adjusting a non-zero value of the plurality of weight values based at least in part on the initial value such that at least one of the selected one or more weight values is set to 0;

adding the initial value and non-zero values of the selected one or more weight values selected for the respective pairs of coordinates to obtain a cumulative value;

deriving a mapped value based on a non-linear function of the cumulative value; and outputting the mapped value to derive a second image data, the second image data representing a detection result of the object.

* * * * *